United States Patent
Yagyu et al.

(10) Patent No.: US 7,553,215 B2
(45) Date of Patent: Jun. 30, 2009

(54) PROCESS OF FORMING A DEFLECTION MIRROR IN A LIGHT WAVEGUIDE

(75) Inventors: Hiroyuki Yagyu, Hirakata (JP); Tooru Nakashiba, Osaka (JP); Shinji Hashimoto, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 0 days.

(21) Appl. No.: 11/892,576

(22) Filed: Aug. 24, 2007

(65) Prior Publication Data

US 2009/0049964 A1 Feb. 26, 2009

(51) Int. Cl.
*B24B 1/00* (2006.01)

(52) U.S. Cl. .............. 451/41; 451/54; 125/12; 430/321; 430/323; 385/14; 438/31; 438/69

(58) Field of Classification Search ............ 451/41, 451/54, 28; 125/12; 385/47, 14, 15; 216/24; 257/918; 430/321, 323; 65/386; 438/31, 438/69
See application file for complete search history.

(56) References Cited

U.S. PATENT DOCUMENTS

| | | | |
|---|---|---|---|
| 6,669,537 B2 * | 12/2003 | Maeda et al. ............... 451/41 |
| 6,737,678 B2 * | 5/2004 | Kawakami et al. ............. 257/79 |
| 7,057,214 B2 * | 6/2006 | Giorgi et al. ................. 257/118 |
| 2003/0104765 A1 * | 6/2003 | Maeda et al. .................. 451/41 |
| 2004/0029053 A9 * | 2/2004 | Steinberg ..................... 430/321 |
| 2004/0090764 A1 * | 5/2004 | Niida et al. .................... 362/31 |
| 2005/0001332 A1 * | 1/2005 | Giorgi et al. ................. 257/918 |
| 2005/0155954 A1 * | 7/2005 | Oba et al. .............. 219/121.67 |
| 2006/0110098 A1 * | 5/2006 | Hayamizu et al. ............. 385/14 |
| 2007/0183718 A1 * | 8/2007 | Bae et al. ....................... 385/47 |

FOREIGN PATENT DOCUMENTS

JP 10-300961 A 11/1998

* cited by examiner

*Primary Examiner*—Eileen P. Morgan
(74) *Attorney, Agent, or Firm*—Cheng Law Group PLLC

(57) ABSTRACT

A process of forming a deflection mirror in a light waveguide with a use of a dicing blade having a cutting end with a flat top cutting face and at least one slanted side cutting face. The process includes a cutting step of cutting a surface of the light waveguide to a depth not greater than a width of the flat top cutting face, thereby forming a groove in the surface of the light waveguide. The groove has a slanted surface which is formed by the slanted cutting face to define the deflection mirror in the waveguide.

3 Claims, 4 Drawing Sheets

PROCESS OF FORMING A DEFLECTION MIRROR IN A LIGHT WAVEGUIDE

TECHNICAL FIELD

The present invention is directed to a process of forming a deflection mirror in a light waveguide of planar structure.

BACKGROUND ART

In order to change a direction of light proceeding into or out of a planar light waveguide, the light waveguide is formed with a groove with a slanted surface which defines a deflection mirror. The groove is formed by a process for example disclosed in Japanese Patent Publication No. 10-300961, in which a dicing blade is utilized to cut a surface of the light waveguide to give the groove. The dicing blade utilized in the publication is configured to have a V-shaped cutting end with a nose angle of about 90° or a wedge-shaped cutting end with a nose angle of about 45°. In view of that the light waveguide is processed to give the groove normally having a depth of 100 μm, the dicing blade having the sharp cutting edge is susceptible to being damaged, and also to a fluctuation while being driven to rotate and advance along a straight path, which results in excessive wearing of the blade and therefore making the resulting groove inaccurate. Further, since the dicing blade is placed perpendicular to the surface of the light waveguide, the resulting deflection mirror will be easy to deviate from an intended potion as the dicing blade is caused to vary a cutting depth.

SUMMARY OF THE INVENTION

The present invention has been achieved to provide an improved process of forming a deflection mirror in a light waveguide which is capable of eliminating the above problem. The process in accordance with the present invention utilizes a dicing blade having a cutting end with a flat top cutting face and at least one slanted side cutting face, and comprises a cutting step of cutting a surface of the light waveguide to a depth not greater than a width of the flat top cutting face so as to form therein a groove having a slanted surface which is formed by the slanted side cutting face to define the deflection mirror. With the provision of the flat top cutting face, the dicing blade utilized in the process can be therefore given a sufficient strength against the wearing of the side cutting face as well as undesired fluctuation while being rotated, thereby keeping accuracy of the resulting groove over a prolonged use of repeating the cutting processes.

Preferably, the dicing blade includes in its surface abrasive granules having an abrasion scale of 4500 to 6000 according to the Japanese Industry Standard R6001 for smoothening the deflection mirror.

Further, in order to precisely control the depth of the groove, i.e., a position of the deflection mirror in the light waveguide, the cutting step may include sub-steps of lowering the dicing blade relative to the light waveguide to a predetermined first level to form a preliminary groove having a depth less than a final depth intended to be given to the groove, and releasing the dicing blade away from the light waveguide. Then, it is made to measure an open-end width of the preliminary groove to obtain an actual depth of the preliminary groove when the dicing blade is lowered to the first level. The actual depth is calculated from the open-end width and a known geometrical configuration of the cutting end of the dicing blade. Then, it is made to calculate a target level where the dicing blade operates to cut the light waveguide to an intended final depth so as to form the groove. The target level is obtained in terms of the first level, the actual depth of the preliminary groove and the indented final depth. Subsequently, the dicing blade is lowered to thus obtained target level to form the groove with the deflection mirror precisely at the intended position.

When forming a plurality of deflection mirrors respectively in a plurality of the light waveguides horizontally arranged in a parallel relation with each other, it is preferred to control the target level for each of the deflection mirrors. In this instance, the dicing blade is lowered to the predetermined level at a plurality of points respectively meeting with the light waveguides to form the preliminary groove at each of the points. After releasing the dicing blade away from the light waveguides, it is made to measure an open-end width at each one of points where deflection mirrors are formed, and to calculate the actual depth at each point of the preliminary groove. Then, the target level of the dicing blade at each point is obtained based upon the actual depth, the first level, and the final depth. Subsequently, the dicing blade is controlled to advance along a straight path perpendicular to the length of the waveguides while continuously varying a cutting depth towards the target levels at the points, so as to cut the groove having the final depth. The preliminary grooves may be made continuous along the straight path by advancing the dicing blade along the straight path.

In a preferred embodiment, the light waveguide is composed of a first clad layer, a core layer superimposed on the first clad layer, and a second clad layer superimposed on the first clad layer over the core layer and merging into the first clad layer to surround the core layer. In this instance, the cutting process is applied to cut the core layer prior to being covered by the second clad layer.

Further, the process of the present invention may include an additional step of irradiating an energy beam to the slanted surface of the groove for smoothening the resulting deflection mirror, or of coating the slanted surface of the groove with a resin for smoothening the resulting deflection mirror. When irradiating the energy beam, a flat bottom formed in the groove by the flat top cutting face gives sufficient space which enables to irradiate the energy beam along a direction normal to the slanted surface for effective smoothening of the resulting deflection mirror.

BEST MODE FOR CARRYING OUT THE INVENTION

Figure 1:
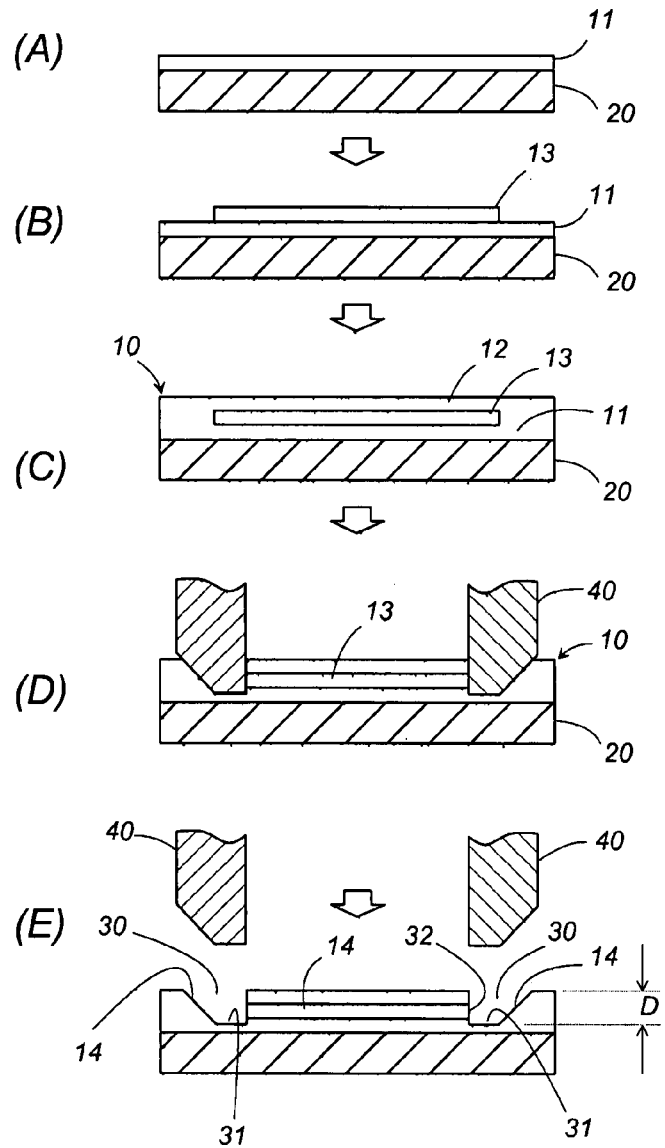
FIG. 1 is a set of sectional views illustrating a process in accordance with a first embodiment of the present invention.
Figure 2:
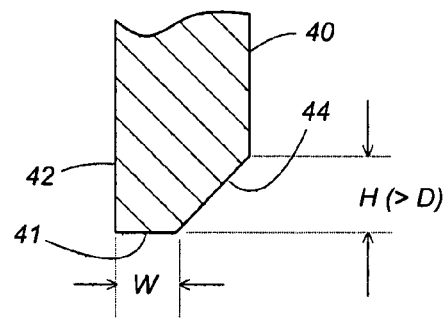
FIG. 2 illustrates a section of a cutting end of a dicing blade utilized in the above process.

Referring now to FIGS. 1 and 2, there is shown a process of forming a deflection mirror 14 in a light waveguide 10 in accordance with a first embodiment of the present invention. The light waveguide 10 is formed on a substrate 20 and is composed of a core layer 13 surrounded by first and second clad layers 11 and 12. The first and second clad layers are both made of an ultraviolet curable transparent resin having a refractive index of 1.52, while the core layer 13 is made of a like ultraviolet curable transparent resin having a refractive index of 1.54. The first clad layer 11 is formed by spin-coating the UV-curable resin on the substrate 20 and curing the resin by exposure to an ultraviolet irradiation to have a thickness of about 20 μm. The core layer 13 is formed by coating the UV-curable resin on the first clad layer 11 and curing the resin by selective exposure to the ultraviolet irradiation through a mask to have a predetermined pattern having a thickness of about 40 μm. Uncured portion of the resin is washed out by an organic solvent (FIG. 1(B)). Thereafter, the UV-curable resin is applied over the first clad layer 11 over the core layer 13 and is cured by exposure to the ultraviolet irradiation to form the second clad layer 12 which merges with the first clad layer 11 to surround the core layer 13, as shown in FIG. 1(C), thereby establishing the light waveguide 10 of a planar structure. The UV resin may include an epoxy-based resin or any other resin such as PGMEA (Propylene Glycol Monomethyl Ether Acetate).

The deflection mirror 14 is formed in the light waveguide 10 to reflect a light passing through the core layer 13 to a direction perpendicular to a plane of the light waveguide 10 or to reflect an incoming light to the core layer 13. In the illustrated instance, two deflection mirrors 14 are realized by two grooves 30 respectively formed in the opposite ends of the clad layers 13. Each of the grooves 30 is formed by cutting the top surface of the light waveguide 10 with the use of a dicing blade 40 to have a flat bottom 31, an upright side 32, and an inclined side opposed to the upright side to define the deflection mirror 14. As shown in FIG. 2, the dicing blade 40 has a cutting end of which cross-section is analogous to that of the groove 30, and includes a flat top cutting face 41, a straight side cutting face 42, and a slanted side cutting face 44. The fat top cutting face 41 is dimensioned to have a width (W) of 50 μm or greater, when the groove 30 is formed to have a depth (D) of 50 μm. The slanted side cutting face 44 is inclined at an angle of 45° with respect to the flat top cutting face 41, and has a height (H) greater than the width (W). The dicing blade 40 is lowered while being driven to rotate with its straight side cutting face 42, i.e., a plane of the dicing blade normal to the light waveguide 10 in order to cut the groove 30 of which depth (D) is not greater than the width (W) of the flat top cutting face 41.

Having the flat top cutting face 41, the dicing blade 40 is given an increased strength at its cutting end bearing a maximum cutting resistance, such that the cutting end can be kept in an intended position to precisely develop the groove 30 and therefore the deflection mirror 14. Especially, by limiting the depth (D) of the groove 30 not greater than the width (W) of the flat top cutting face 41, the dicing blade 40 can be kept from receiving an excessive cutting resistance at its cutting end, and being therefore free from fluctuation or damage during the cutting operation to give the precise groove, while assuring a prolonged use of the blade.

Figure 3:
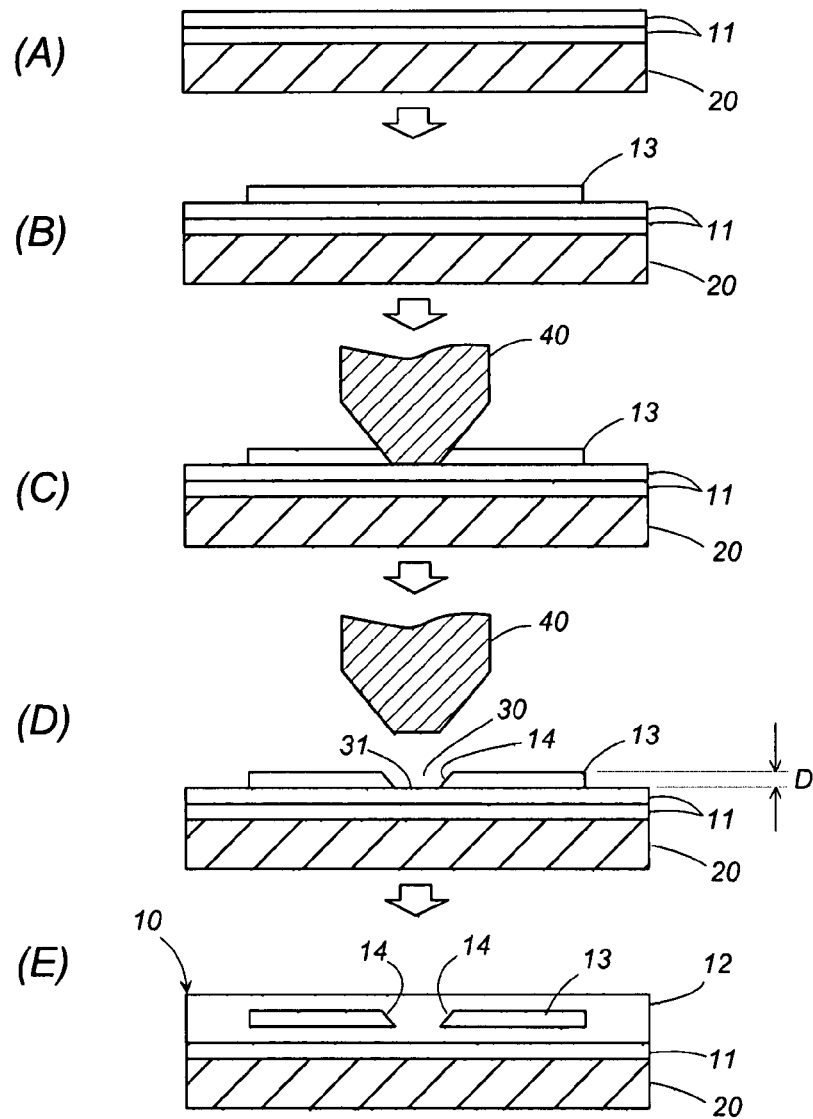
FIG. 3 is a set of sectional views illustrating a process in accordance with a second embodiment of the present invention.
Figure 4:
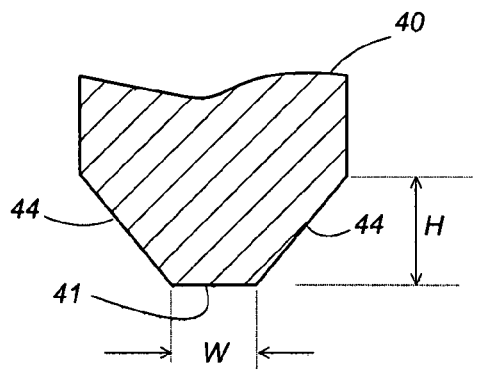
FIG. 4 illustrates a section of a cutting end of a dicing blade utilized in the above process of FIG. 3.

FIGS. 3 and 4 illustrate a second embodiment of the present invention in which the cutting is made prior to the core layer 13 being covered by the second clad layer 12 and with the use of a dicing blade 40 having double-sided slanted cutting faces. The dicing blade 40 has a cutting end defined by a flat top cutting face 41, and an opposed pair of slanted side cutting faces 44. The flat top cutting face 41 has a width (W) which is greater than a depth (D) of the groove cut into the clad layer 13. Each of the slanted side cutting faces 44 is inclined at an angle of 45° with respect to the flat top cutting face 41 and has a height (H) greater than the width (W) of the top cutting face 41. In this instance, after the core layer 13 is formed on the laminate of the first clad layers 11, and before the second clad layer 14 is formed to cover the core layer 13, the dicing blade 40 is lowered to cut the core layer 13 directly to give a corresponding groove 30 with a pair of deflection mirrors 14 in the core layer 13. The groove 30 is given a depth (D) equal to the thickness of the core layer 30 which is less than the width (W) of the flat top cutting face 41. After releasing the dicing blade 40 away from the core layer 13, the UV resin is applied on the upper first clad layer 11 over the core layer 13 to form a second clad layer 12 which merges with the upper first clad layer 11 to surround the core layer 13.

Figure 5:
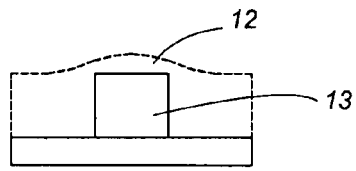
FIG. 5 is a sectional view of a portion of a light waveguide to be treated by the above process.
Figure 6:
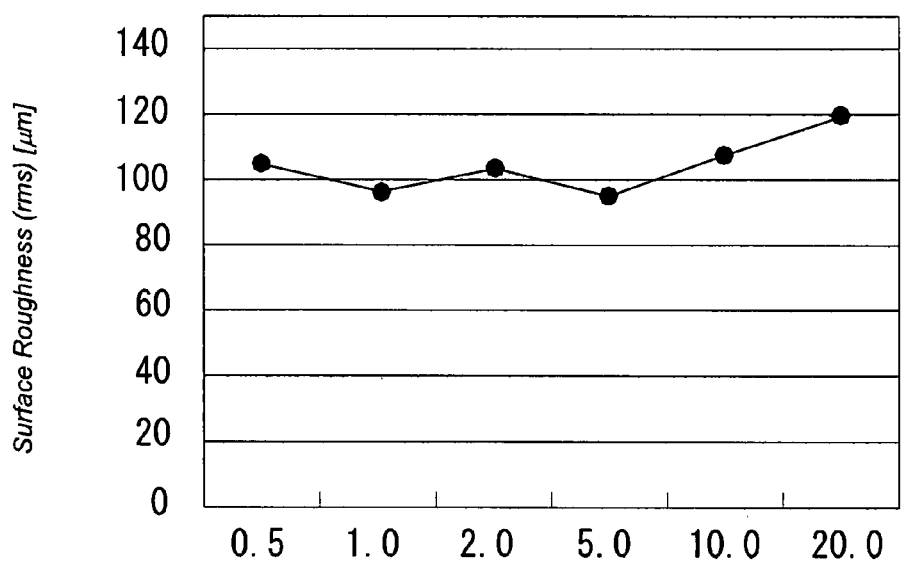
FIG. 6 is a graph illustrating a relation between a surface roughness and a running speed of the dicing blade.

With the direct cutting of the core layer 13, the cutting can be free from a possible variation in a thickness of the clad layer 12 covering the core layer 13, as shown in FIG. 5, and can be made accurately to an intended depth. Further, since the dicing blade 40 experiences less cutting resistance than in a case of cutting the core layer through the clad layer, an intended smooth finish can be given to the resulting deflection mirror 14 at a reduced speed of driving the dicing blade 40. For example, an intended smoothness of the mirror, i.e., a surface roughness of less than 110 rms (nm) is obtained only at a driving speed of around 1.0 mm/s while cutting the core layer through the clad layer, the same smoothness can be obtained also at an increased speed of around 10.0 mm/s, as shown in FIG. 6, while cutting the core layer directly, i.e., without cutting the clad layer. This reduces a processing time of cutting the groove about 10 times faster. The driving speed is used herein to mean a speed of advancing the dicing blade rotating at a constant rotating speed, for example, 15,000 rpm, along one straight path across the light waveguide and also a speed of lowering the dicing blade into the surface of the light waveguide.

Figure 7:
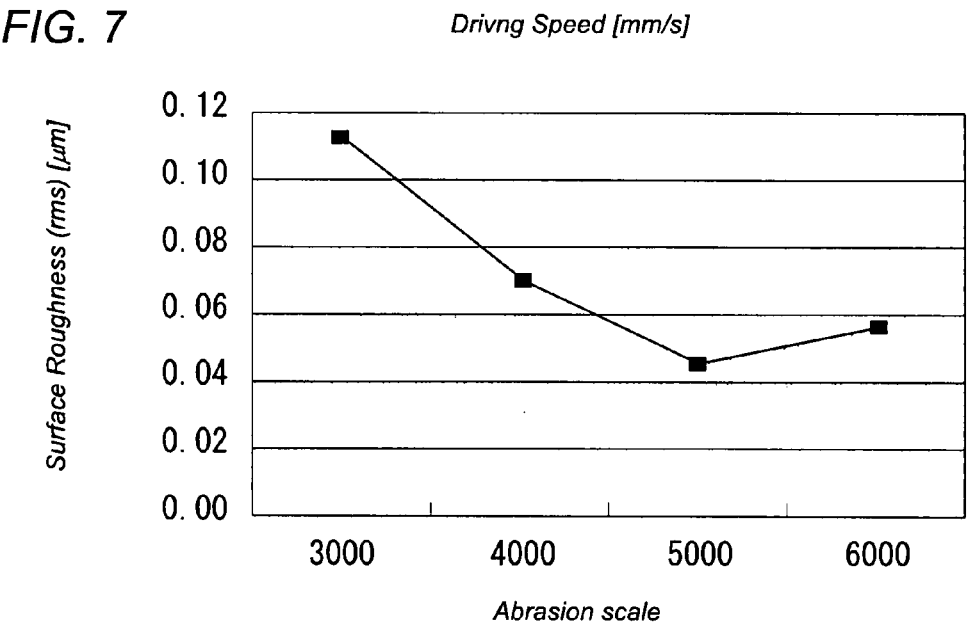
FIG. 7 is a graph illustrating a relation between a surface roughness and a grain size of abrasive granules included in the dicing blade.

In anyone of the above embodiments, the dicing blade 40 has its cutting face finished with diamond granules selected to have an abrasion scale of #4500 to #5000 (equivalent to an average grain size of 2.0 μm to 4.0 μm) in accordance with the JIS (Japanese Industrial Standard) R6001, in order to give the intended surface smoothness to the deflection mirror 14, as shown in FIG. 7. If the granules having the average grain size less than the above range are used, the abrasion would be insufficient to give only a poorly polished face to the resulting mirror.

The deflection mirror may be also polished or smoothed by exposure to an energy beam irradiation. The irradiation of the energy beam is effective to ablate minute surface irregularity possibly remaining on the mirror surface. An infrared laser is found advantageous as it provides its high intensity beam with an easy handling. In view of that the UV-curable resin utilized for the light waveguide has a molecular vibration absorption at a wavelength of around 10 μm, a carbon dioxide laser ($CO_2$ laser) generating the laser beam of such wavelength is particularly advantageous.

In order to further improve reflectivity, the mirror may be finished with a reflective film made of a metal or dielectric multi-layered coating to be formed by plating or spattering deposition. Such reflective film may be also effective to reflect the light to a specific direction which is not possible by a total reflection.

For instance, the slanted surface or the deflection mirror 14 formed at the step of FIG. 1(E) is treated with a TEA-$CO_2$ laser beam having the wavelength of 9.8 μm which is irradiated along a direction normal to the mirror 14 with an energy density of 9 mJ/mm$^2$, four (4) irradiation pulses having a pulse width of 9.3 μs, and a repeated frequency of 100 Hz to an irradiation area of 100 μm$^2$. After the laser irradiation, the surface roughness is improved from 100 nm (rms) to 50 nm (rms). Then, the reflective film of gold is deposited on the deflection mirror. For evaluation of reflection loss, the waveguide is cut at a point spaced inwardly from the upright side 32 by a distance of 1 cm so as to measure intensity of light which is incident on the mirror 14 and that coming outwardly of that point after being reflected at the mirror. The resulting reflection loss is found to be 0.7 dB at a wavelength of 670 μm.

It is noted in this connection that the irradiation of the laser beam in a direction normal to the mirror 14 is made easy and possible with the presence of the flat bottom 31 in the groove 30 of which width (W) is not less than the depth (D) of the groove.

Alternatively, the mirror 14 may be finished with a resin coating which has the same refractive index as the core layer 13 and is made of a like resin material as the core layer or the clad layer. The resin coating is made by applying a diluted solution of the resin and subsequently curing it. Also, in this instance, the flat bottom 31 of the groove 30 can hold an excess amount of the solution to leave the cured coating of uniform thickness only on the deflection mirror 14 opposite to the core layer 13. For instance, when the core layer 13 is made of PGMEA (Propylene Glycol Monomethyl Ether Acetate), a varnish solution containing 2 wt % of PGMEA is utilized to coat the mirror followed by being selectively cured by exposure to the UV light beam to give the resin coating of uniform thickness. Thereafter, the reflective film of gold is deposited on the resin coating. Also, the like evaluation of the reflection loss is made in a manner as described in the above to give a result that the reflection loss is found to be 0.8 dB at a wavelength of 670 μm. The resin coating is advantageous in its compatibility to the core layer and the clad layer in terms of thermal expansion coefficient.

Figure 8:
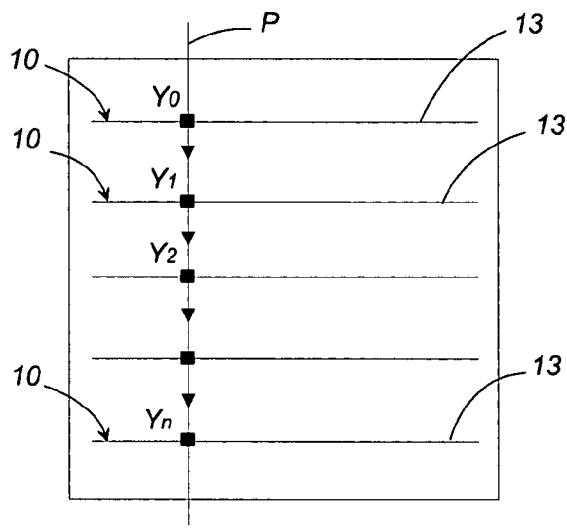
FIG. 8 is a plan view illustrating a straight path along which the dicing blade advances to form a plurality of deflection mirrors along the straight path in accordance with a third embodiment of the present invention.
Figure 9:
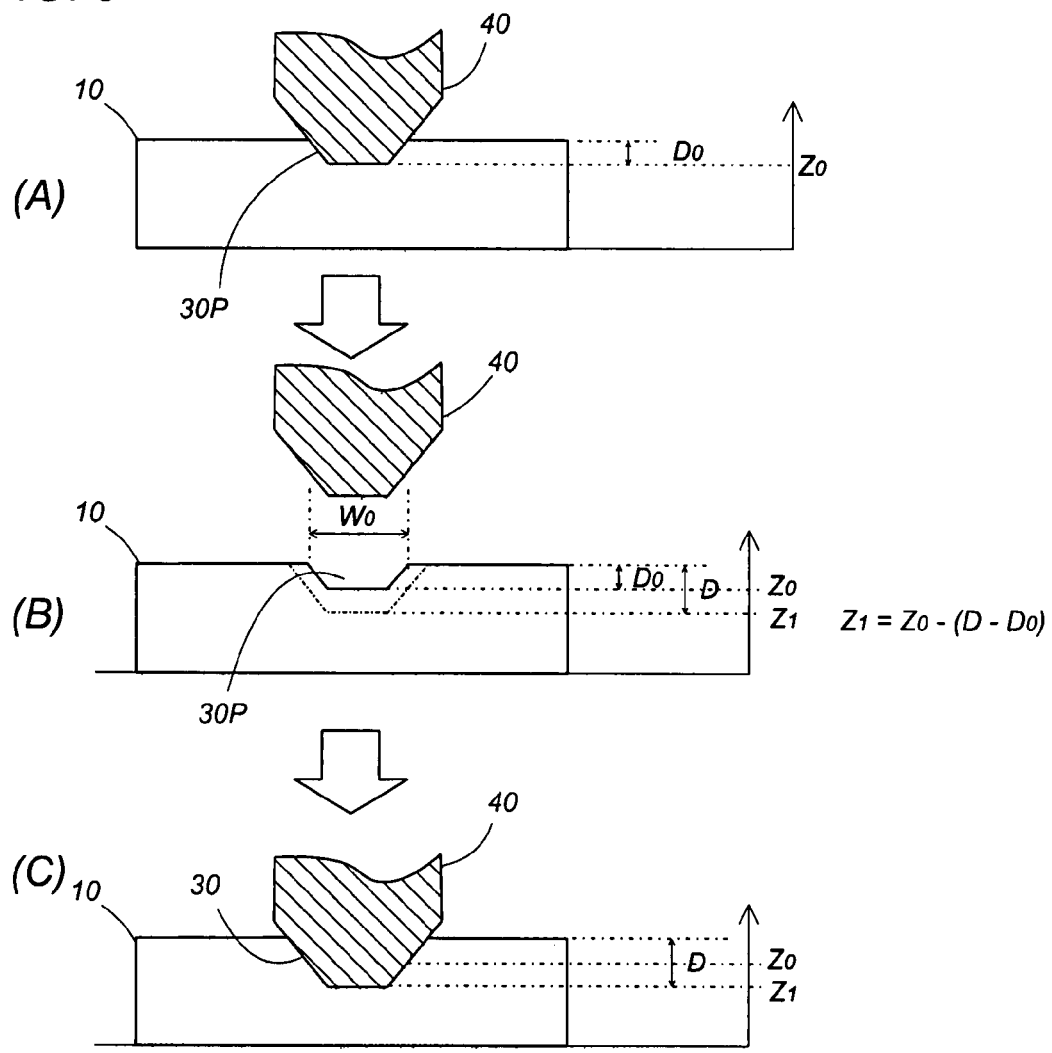
FIG. 9 is a set of sectional views illustrating a process for forming a plurality of the deflection mirrors of the above embodiment of FIG. 8.

The method of the present invention is used to cut the grooves in a plurality of the core layers 13 or waveguides commonly formed on the substrate 20 while advancing the dicing blades along a straight path P perpendicular to the length of the core layers 13, as shown FIG. 8. The core layers 13 are arranged horizontally in a parallel relation with each other. In consideration of a possible variation of a height of the top surfaces among the plurality of the light guides 10, a control is made to lower the dicing blade to an exact level of forming the groove of the intended depth D at each of points $Y_0$ to $Y_n$ crossing with the core layers 13 when advancing the dicing blade along the straight path P. For this purpose, it is first made to lower the dicing blade with respect to the light waveguide 10 to a predetermined first level $Z_0$ and advance it along the straight path P while keeping it at the first level $Z_0$ in order to form a preliminary groove 30P, as shown in FIG. 9(A). The first level $Z_0$ is measured from a reference level and is selected to give a depth $D_0$ which is less than the final depth D of the groove 30, for instance about half of the final depth D. After removing the dicing blade 40 away from the waveguide, it is made to measure an open-end width $W_0$ of the preliminary groove 30P, as show in FIG. 9(B), for each of the points $Y_0$ to $Y_n$, so as to calculate a corresponding depth $D_0$ of the preliminary groove 30P for each point based upon the open-end width $W_0$ and a known geometrical configuration of the cutting end of the dicing blade 40, and to calculate a target level $Z_1$ which is the first level $Z_0$ minus a difference between the intended final depth D and the depth $D_0$ of the preliminary groove, i.e., $Z_1=Z_0-(D-D_0)$. The target level $Z_1$ for each of the points $Y_0$ to $Y_n$ is stored in a memory. Next, the dicing blade 40 is controlled to advance in the preliminary groove 30P along the straight path P as being lowered respectively to the target level $Z_1$, as shown in FIG. 9(C), determined respectively to the positions $Y_0$ to $Y_n$ before the dicing blade 40 reaches the individual points. In this manner, each of the waveguides 10 can be cut to a precisely controlled depth D to make the resulting deflection mirror 14 in an exact relation to the end of the core layer 13. When the final depth D of the groove 30 is 50 μm, the first level $Z_0$ is selected to give the preliminary groove 30P having the depth $D_0$ of about 30 μm. Although the preliminary groove 30P is made continuous along the straight path P in the above embodiment, it is equally possible to cut the light waveguides only at the points $Y_0$ to $Y_n$ for the purpose of calculating the target level for each of the points $Y_0$ to $Y_n$.

Although the above control is particularly advantageous for cutting the plurality of the waveguides arranged along the straight path, it is equally applicable for cutting the single waveguide. Further, although the above illustrated embodiments are shown to cut the groove 30 in the waveguide 10 of planar configuration in which the second clad layer 12 is superimposed on the first clad layer 12 to merge into the first clad layer to surround the core layer 13 superimposed on the first clad layer, the present invention should be not limited to this specific embodiment and be equally applicable to the light waveguide comprising one or more optical fibers mounted on a substrate.

The invention claimed is:

1. A process of forming deflection mirrors in a plurality of light waveguides, said process comprising the steps of:

advancing a dicing blade across said plurality of light waveguides while lowering said dicing blade to a predetermined first level of an initial depth at least at a plurality of points where said light waveguides meet so as to make a preliminary cut in each of said light waveguides to form a preliminary groove having an initial depth, releasing said dicing blade away from said light waveguides, measuring an open-end width of the preliminary groove at each of said points to (1) calculate the initial depth of said preliminary groove based upon said open-end width and a geometrical configuration of the dicing blade, and (2) calculate a target level for each of said points in terms of said predetermined first level, said initial depth of the preliminary groove, and a final depth of a groove, said target level being defined as a distance from said first level minus a difference between the initial depth of said preliminary groove and said final depth of said groove; and advancing said dicing blade along a straight path across said plurality of light waveguides while lowering said dicing blade to said target level at each of said points to cut said groove having said final depth and a slanted surface to define said deflection mirrors, wherein the initial depth of the preliminary groove is less than the final depth of the groove, wherein said plurality of light waveguides are arranged in a horizontal plane and spaced in a parallel relation with each other, wherein said dicing blade has a cutting end with a flat top cutting face and at least one slanted side cutting face, wherein said final depth is not greater than a width of said flat top cutting face, and wherein said slanted surface of said groove is formed by said slanted side cutting face of said dicing blade.

2. A process as set forth in claim 1, wherein
said preliminary cut is made along a straight path to make said preliminary grooves continuous along said straight path.

3. A process as set forth in claim 1, wherein said lowering of said dicing blade to said target level at each of said points is adjusted to account for variations of height of top surfaces of each said light waveguides.

* * * * *